(12) United States Patent
Nair et al.

(10) Patent No.: US 9,197,886 B2
(45) Date of Patent: Nov. 24, 2015

(54) DETECTING PLANT DEGRADATION USING PEER-COMPARISON

(71) Applicant: ARRIS Group, Inc., Suwanee, GA (US)

(72) Inventors: Harindranath P. Nair, Hillsboro, OR (US); Christopher J. Bates, Ashland, MA (US); Vishal Dhruv, Waban, MA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/209,117

(22) Filed: Mar. 13, 2014

(65) Prior Publication Data

US 2014/0282774 A1 Sep. 18, 2014

Related U.S. Application Data

(60) Provisional application No. 61/779,752, filed on Mar. 13, 2013.

(51) Int. Cl.
*H04N 7/173* (2011.01)
*H04N 17/00* (2006.01)

(52) U.S. Cl.
CPC .................................. *H04N 17/004* (2013.01)

(58) Field of Classification Search
USPC .................................................. 725/107, 129
See application file for complete search history.

(56) References Cited

U.S. PATENT DOCUMENTS

| | | | |
|---|---|---|---|
| 3,838,221 A | 9/1974 | Nosaka et al. |
| 4,245,342 A | 1/1981 | Entenman et al. |
| 4,385,392 A | 5/1983 | Angell et al. |
| 4,811,360 A | 3/1989 | Potter |
| 4,999,787 A | 3/1991 | McNally et al. |
| 5,197,064 A | 3/1993 | Chao et al. |
| 5,228,060 A | 7/1993 | Uchiyama |
| 5,251,324 A | 10/1993 | McMullan et al. |

(Continued)

FOREIGN PATENT DOCUMENTS

| | | |
|---|---|---|
| DE | 69631420 T2 | 12/2004 |
| EP | 1235402 A2 | 8/2002 |

(Continued)

OTHER PUBLICATIONS

Cable Television Laboratories, Inc., "A Simple Algorithm for Fault Localization Using Naming Convention and Micro-reflection Signature," Invention Disclosure 60193, 2 pages, Jun. 2008.

(Continued)

*Primary Examiner* — Pinkal R Chokshi
*Assistant Examiner* — Alexander Gee
(74) *Attorney, Agent, or Firm* — Stewart M. Wiener

(57) ABSTRACT

A method implemented in a computer system for detecting performance degradation in a hybrid fiber-coaxial (HFC) cable plant having customer premises equipment (CPE) elements, active elements, and passive elements. The method collects radio frequency (RF) metric values, computes absolute deviation values of the RF metric values from reference RF metric values, computes relative hierarchical deviation values of the RF metric values, and computes relative peer deviation values of the RF metric values. The method sends an alarm message to an operator when the absolute deviation value, relative hierarchical deviation value, or relative peer deviation value for any element exceeds a threshold value.

19 Claims, 10 Drawing Sheets

(56) References Cited

U.S. PATENT DOCUMENTS

| | | |
|---|---|---|
| 5,271,060 A | 12/1993 | Moran et al. |
| 5,278,977 A | 1/1994 | Spencer et al. |
| 5,347,539 A | 9/1994 | Sridhar et al. |
| 5,390,339 A | 2/1995 | Bruckert et al. |
| 5,463,661 A | 10/1995 | Moran et al. |
| 5,532,865 A | 7/1996 | Utsumi et al. |
| 5,557,603 A | 9/1996 | Barlett et al. |
| 5,606,725 A | 2/1997 | Hart |
| 5,631,846 A | 5/1997 | Szurkowski |
| 5,692,010 A | 11/1997 | Nielsen |
| 5,694,437 A | 12/1997 | Yang et al. |
| 5,732,104 A | 3/1998 | Brown et al. |
| 5,757,526 A | 5/1998 | Shiragaki et al. |
| 5,771,274 A | 6/1998 | Harris |
| 5,790,523 A | 8/1998 | Ritchie, Jr. et al. |
| 5,862,451 A | 1/1999 | Grau et al. |
| 5,867,539 A | 2/1999 | Koslov |
| 5,870,429 A | 2/1999 | Moran et al. |
| 5,886,749 A | 3/1999 | Williams et al. |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,154,503 A | 11/2000 | Strolle et al. |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran, III et al. |
| 6,385,773 B1 | 5/2002 | Schwartzman et al. |
| 6,389,068 B1 | 5/2002 | Smith et al. |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,477,526 B2 | 11/2002 | Hayashi et al. |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al-Araji et al. |
| 6,556,562 B1 | 4/2003 | Bhagavath et al. |
| 6,556,660 B1 | 4/2003 | Li et al. |
| 6,559,756 B2 | 5/2003 | Al-Araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,775,840 B1 | 8/2004 | Naegel et al. |
| 6,785,292 B1 * | 8/2004 | Vogel ............... H04L 12/2801 348/E17.001 |
| 6,785,473 B1 | 8/2004 | Sasaki et al. |
| 6,816,463 B2 | 11/2004 | Cooper et al. |
| 6,834,057 B1 | 12/2004 | Rabenko et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart, Jr. et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,985,437 B1 | 1/2006 | Vogel |
| 6,987,754 B2 | 1/2006 | Shahar et al. |
| 6,999,408 B1 | 2/2006 | Gomez |
| 7,002,899 B2 | 2/2006 | Azenkot et al. |
| 7,010,002 B2 | 3/2006 | Chow et al. |
| 7,017,176 B1 | 3/2006 | Lee et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,145,887 B1 | 12/2006 | Akgun et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,286,756 B1 | 10/2007 | Marshall et al. |
| 7,295,518 B1 | 11/2007 | Monk et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,584,298 B2 | 9/2009 | Klinker et al. |
| 7,616,654 B2 | 11/2009 | Moran, III et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,693,042 B1 | 4/2010 | Wei |
| 7,693,090 B1 | 4/2010 | Kimpe |
| 7,701,938 B1 | 4/2010 | Bernstein et al. |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,760,624 B1 | 7/2010 | Goodson et al. |
| 7,764,231 B1 | 7/2010 | Karr et al. |
| 7,778,314 B2 | 8/2010 | Wajcer et al. |
| 7,787,557 B2 | 8/2010 | Kim et al. |
| 7,792,183 B2 | 9/2010 | Massey et al. |
| 7,826,569 B2 | 11/2010 | Popper et al. |
| 7,856,049 B2 | 12/2010 | Currivan et al. |

(56) References Cited

U.S. PATENT DOCUMENTS

| | | |
|---|---|---|
| 7,876,697 B2 | 1/2011 | Thompson et al. |
| 7,953,144 B2 | 5/2011 | Allen et al. |
| 7,958,534 B1 | 6/2011 | Beser |
| 7,970,010 B2 | 6/2011 | Denney et al. |
| 7,983,162 B1 | 7/2011 | Ford et al. |
| 8,000,254 B2 | 8/2011 | Thompson et al. |
| 8,037,541 B2 | 10/2011 | Montague et al. |
| 8,040,915 B2 | 10/2011 | Cummings |
| 8,059,546 B2 | 11/2011 | Pai et al. |
| 8,081,674 B2 | 12/2011 | Thompson et al. |
| 8,116,360 B2 | 2/2012 | Thibeault |
| 8,265,559 B2 | 9/2012 | Cooper et al. |
| 8,279,764 B2 | 10/2012 | Cooper et al. |
| 8,284,828 B2 | 10/2012 | Cooper et al. |
| 8,345,557 B2 | 1/2013 | Thibeault et al. |
| 8,526,485 B2 | 9/2013 | Thompson et al. |
| 8,537,972 B2 | 9/2013 | Thompson et al. |
| 8,594,118 B2 | 11/2013 | Cooper et al. |
| 2001/0055319 A1 | 12/2001 | Quigley et al. |
| 2002/0038461 A1 | 3/2002 | White |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0119783 A1 | 8/2002 | Bourlas et al. |
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0067944 A1 | 4/2003 | Sala et al. |
| 2003/0101463 A1 | 5/2003 | Greene et al. |
| 2003/0108052 A1 | 6/2003 | Inoue et al. |
| 2003/0120819 A1 | 6/2003 | Abramson |
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052248 A1 | 3/2004 | Frank et al. |
| 2004/0052356 A1 | 3/2004 | McKinzie et al. |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams et al. |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0099951 A1 | 5/2005 | Mohan et al. |
| 2005/0108763 A1 | 5/2005 | Baran et al. |
| 2005/0122996 A1 | 6/2005 | Azenkot et al. |
| 2005/0144648 A1* | 6/2005 | Gotwals ............. H04N 7/17309 725/111 |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0204397 A1* | 9/2005 | Miyazoe ................. H04B 3/46 725/107 |
| 2005/0226161 A1 | 10/2005 | Jaworski |
| 2005/0281200 A1 | 12/2005 | Terreault |
| 2006/0013147 A1 | 1/2006 | Terpstra |
| 2006/0088056 A1 | 4/2006 | Quigley et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2006/0291503 A1 | 12/2006 | Chapman |
| 2007/0002752 A1 | 1/2007 | Thibeault et al. |
| 2007/0030805 A1 | 2/2007 | Pantelias et al. |
| 2007/0058542 A1 | 3/2007 | Thibeault |
| 2007/0076592 A1 | 4/2007 | Thibeault |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0121712 A1 | 5/2007 | Okamoto |
| 2007/0133672 A1 | 6/2007 | Lee et al. |
| 2007/0143654 A1 | 6/2007 | Joyce et al. |
| 2007/0147489 A1 | 6/2007 | Sun |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0201547 A1 | 8/2007 | Willcocks et al. |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223512 A1 | 9/2007 | Cooper et al. |
| 2007/0223513 A1 | 9/2007 | Pantelias et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0065960 A1 | 3/2008 | Cheng et al. |
| 2008/0069006 A1 | 3/2008 | Walter et al. |
| 2008/0075157 A1 | 3/2008 | Allen et al. |
| 2008/0101210 A1 | 5/2008 | Thompson et al. |
| 2008/0125984 A1 | 5/2008 | Skendzic et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0109877 A1 | 4/2009 | Murray et al. |
| 2009/0158096 A1 | 6/2009 | Ali et al. |
| 2009/0249421 A1 | 10/2009 | Liu et al. |
| 2009/0252234 A1 | 10/2009 | Samdani et al. |
| 2010/0083356 A1 | 4/2010 | Steckley et al. |
| 2010/0095360 A1 | 4/2010 | Pavlovski et al. |
| 2010/0128739 A1 | 5/2010 | Jung et al. |
| 2010/0154016 A1 | 6/2010 | Li et al. |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0322390 A1 | 12/2010 | Bialk et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0072127 A1 | 3/2011 | Gerber et al. |
| 2011/0099570 A1 | 4/2011 | Sadja et al. |
| 2011/0110415 A1 | 5/2011 | Cooper et al. |
| 2011/0116387 A1 | 5/2011 | Beeco et al. |
| 2011/0150058 A1 | 6/2011 | Oh |
| 2011/0153683 A1 | 6/2011 | Hoskinson |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |

(56) References Cited

U.S. PATENT DOCUMENTS

| | | | |
|---|---|---|---|
| 2011/0243214 A1 | 10/2011 | Wolcott et al. |
| 2012/0027069 A1 | 2/2012 | Clausen et al. |
| 2012/0054312 A1 | 3/2012 | Salinger |
| 2012/0084416 A1 | 4/2012 | Thibeault et al. |
| 2012/0093240 A1 | 4/2012 | McFarland et al. |
| 2012/0115505 A1 | 5/2012 | Miyake et al. |
| 2012/0147751 A1 | 6/2012 | Ulm |
| 2012/0190380 A1 | 7/2012 | Dupray et al. |
| 2013/0003565 A1 | 1/2013 | Gotwals et al. |
| 2013/0041990 A1 | 2/2013 | Thibeault et al. |
| 2013/0051442 A1 | 2/2013 | Cooper et al. |
| 2013/0070772 A1 | 3/2013 | Watson et al. |
| 2013/0128723 A1 | 5/2013 | Thibeault et al. |
| 2013/0148707 A1 | 6/2013 | Thibeault et al. |
| 2013/0286852 A1 | 10/2013 | Bowler et al. |
| 2013/0290783 A1 | 10/2013 | Bowler et al. |
| 2013/0290791 A1 | 10/2013 | Basile et al. |
| 2013/0291034 A1 | 10/2013 | Basile et al. |
| 2013/0294489 A1 | 11/2013 | Thibeault et al. |
| 2014/0029654 A1 | 1/2014 | Thompson et al. |
| 2014/0029655 A1 | 1/2014 | Thompson et al. |
| 2014/0133533 A1 | 5/2014 | Thibeault et al. |
| 2014/0185428 A1 | 7/2014 | Thibeault et al. |
| 2014/0267788 A1 | 9/2014 | Bowler et al. |
| 2014/0269416 A1 | 9/2014 | Bowler et al. |
| 2014/0269869 A1 | 9/2014 | Bowler et al. |
| 2014/0270095 A1 | 9/2014 | Bowler et al. |
| 2014/0278273 A1 | 9/2014 | Bowler et al. |

FOREIGN PATENT DOCUMENTS

| | | | |
|---|---|---|---|
| EP | 1341335 A2 | 9/2003 |
| JP | 55132161 A | 10/1980 |
| JP | 04208707 A | 7/1992 |
| JP | 06120896 A | 4/1994 |
| JP | 06177840 A | 6/1994 |
| JP | 09008738 A | 1/1997 |
| JP | 09162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004172783 A | 6/2004 |
| JP | 2004343678 A | 12/2004 |
| WO | 0192901 A1 | 12/2001 |
| WO | 02/33980 A2 | 4/2002 |
| WO | 0233974 A1 | 4/2002 |
| WO | 2004062124 A1 | 7/2004 |
| WO | 2008103262 A1 | 8/2008 |
| WO | 2009146426 A1 | 12/2009 |

OTHER PUBLICATIONS

Cable Television Laboratories, Inc., "Data-Over-Cable Service Interface Specifications DOCSIS 3.0—MAC and Upper Layer Protocols Interface Specification," CM-SP-MULPIv3.0-I16-110623, Jun. 2011.
Cable Television Laboratories, Inc., "Data-Over-Cable Service Interface Specifications DOCSIS 3.0—MAC and Upper Layer Protocols Interface Specification," CM-SP-MULPIv3.0-I17-111117, Nov. 2011.
Cable Television Laboratories, Inc., "DOCSIS Best Practices and Guidelines: Proactive Network Maintenance Using Pre-Equalization," CM-GL-PNMP-V01-100415, Apr. 2010.
Cable Television Laboratories, Inc., "Pre-Equalization Based Proactive Network Maintenance Process Model for CMs Transmitting on Multiple Upstream Channels," Invention Disclosure 60203, 2 pages, May 2009.
Cable Television Laboratories, Inc., "Pre-Equalization based proactive network maintenance process model", Invention Disclosure 60177, 2 pages, Jun. 2008.
Cable Television Laboratories, Inc., "DOCSIS Best Practices and Guidelines: Proactive Network Maintenance Using Pre-equalization," CM-GL-PNMP-V02-110623, Jun. 2011.
Cable Television Laboratories, Inc., "Data-Over-Cable Service Interface Specifications: DOCSIS 2.0 Radio Frequency Interface Specification," CM-SP-RFIv2.0-I06-040804, Apr. 2004.
L.A. Campos, et al., "Pre-equalization based Pro-active Network Maintenance Methodology", Cable Television Laboratories, Inc., presentation, 32 pages, 2008.
R.L. Howald, et al., "Customized Broadband—Analysis Techniques for Blended Multiplexes," NCTA Technical Papers, 2002.
R. Howald, "Access Networks Solutions: Introduction to S-CDMA," Presentation to Society of Cable Telecommunications Engineers (SCTE) South Florida Chapter, 2009.
R. Howald, "Upstream Snapshots & Indicators (2009)," Regional Samples, Presentation to Society of Cable Telecommunications Engineers (SCTE) South Florida Chapter, Jan. 2010.
R.L. Howald et al., "Characterizing and Aligning the HFC Return Path for Successful DOCSIS 3.0 Rollouts", SCTE Cable-Tec Expo, Oct. 2009.
R. Howald, et al., "DOCSIS 3.0 Upstream: Readiness & Qualification," SCTE Cable-Tec Expo, Oct. 2009.
R. Howald, et al., "The Grown-Up Potential of a Teenage PHY", NCTA Convention and Exposition, May 2012.
R. Howald, "DOCSIS 3.0 Upstream: Technology, RF Variables & Case Studies," Access Networks Solutions, 2009, presentation to Society of Cable Telecommunications Engineers (SCTE) South Florida Chapter, 23 pages, Jan. 2010.
R. Hranac, "Linear Distortions, Part 1," Communication Technology, Jul. 2005.
X. Liu, et al., "Variable Bit Rate Video Services in DOCSIS 3.0 Networks," NCTA Technical Papers, 2008.
Motorola, Inc., "White Paper: Expanding Bandwidth Using Advanced Spectrum Management," Sep. 25, 2003.
H. Newton, Newton's Telecom Dictionary, Flatiron Publishing, 9th ed., pp. 216 and 1023 (definitions of "carrier to noise ratio" and "signal to noise ratio"), Sep. 1995.
M. Patrick, et al., "Delivering Economical IP Video over DOCSIS by Bypassing the M-CMTS with DIBA," SCTE 2007 Emerging Technologies, NCTA Technical Papers, 2007.
A. Popper, et al., "An Advanced Receiver with Interference Cancellation for Broadband Cable Networks," 2002 International Zurich Seminar on Broadband Communications—Access, Transmission, Networking, pp. 23-1-23-6, IEEE, 2002.
A. Popper, et al, "Ingress Noise Cancellation for the Upstream Channel in Broadband Cable Access Systems," 2002 IEEE International Conference on Communications, vol. 3, pp. 1808-1812. IEEE, 2002.
S.U.H. Qureshi, "Adaptive Equalization," Proceedings of the IEEE, vol. 73, No. 9, pp. 1349-1387, Sep. 1985.
S. Ramakrishnan, "Scaling the DOCSIS Network for IPTV," SCTE Conference on Emerging Technologies, NCTA Cable Show, Apr. 2009.
Y.R. Shelke, "Knowledge Based Topology Discovery and Geo-localization", Thesis, Master of Science, Ohio State University, 2010.
R. Thompson, et al., "256-QAM for Upstream HFC," NCTA 2010 Spring Technical Forum Proceedings, pp. 142-152, May 2010.
R. Thompson, et al., "256-QAM for Upstream HFC Part Two", SCTE Cable-Tec Expo 2011, Technical Paper, Nov. 2011.
R. Thompson, et al., "Multiple Access Made Easy," SCTE Cable-Tec Expo 2011, Technical Paper, Nov. 2011.
R. Thompson, et al., "Optimizing Upstream Throughput Using Equalization Coefficient Analysis", National Cable and Telecommunications Association (NCTA) Technical Papers, Apr. 2009.
R. Thompson, et al., "Practical Considerations for Migrating the Network Toward All-Digital", Society of Cable Telecommunications Engineers (SCTE) Cable-Tec Expo, Oct. 2009.
R. Thompson, et al., "64-QAM, 6.4MHz Upstream Deployment Challenges," SCTE Canadian Summit, Toronto, Canada, Technical Paper, Mar. 2011.
B. Volpe, et al., "Cable-Tec Expo 2011: Advanced Troubleshooting in a DOCSIS 3.0 Plant," Nov. 2011.
L. Wolcott, "Modem Signal Usage and Fault Isolation," U.S. Appl. No. 61/301,835, filed Feb. 5, 2010.
F. Zhao, et al., "Techniques for minimizing error propagation in decision feedback detectors for recording channels," IEEE Transactions on Magnetics, vol. 37, No. 1, pp. 592-602, Jan. 2001.
Y. Morishita, et al., "An LMS adaptive equalizer using threshold in impulse noise environments", IEEE, ICT 2003 10th International Conference on Telecommunications, vol. 1, pp. 578-582, Feb. 2003.

* cited by examiner

DETECTING PLANT DEGRADATION USING PEER-COMPARISON

CROSS-REFERENCE TO A RELATED APPLICATION

This application for letters patent relates to and claims the benefit of U.S. Provisional Patent Application Ser. No. 61/779,752, titled "Detecting Plant Degradation using Peer-Comparison", and filed on Mar. 13, 2013, the disclosure of which this application hereby incorporates by reference.

BACKGROUND

The hybrid fiber-coaxial (HFC) cable plant delivers cable services to subscribers using a complex network that includes active and passive components. The HFC network is a broadband network that combines optical fiber and coaxial cable. The optical fiber segment connects a headend to fiber nodes using a length of optical fiber from the headend to each fiber node. The coaxial segment connects each fiber node to approximately 25 to 2000 customer locations using coaxial cable, amplifiers, line extenders, and taps.

Equipment in the HFC cable plant periodically measures the radio frequency (RF) performance of the components of the HFC network using a variety of RF metrics, such as receive power level, signal-to-noise ratio (SNR), and codeword error rate (CER). Degradation in the RF metrics indicates degradation in quality of service to customers, manifesting either as a degradation in network performance, or in extreme cases, as a service outage.

DETAILED DESCRIPTION

Figure 1:
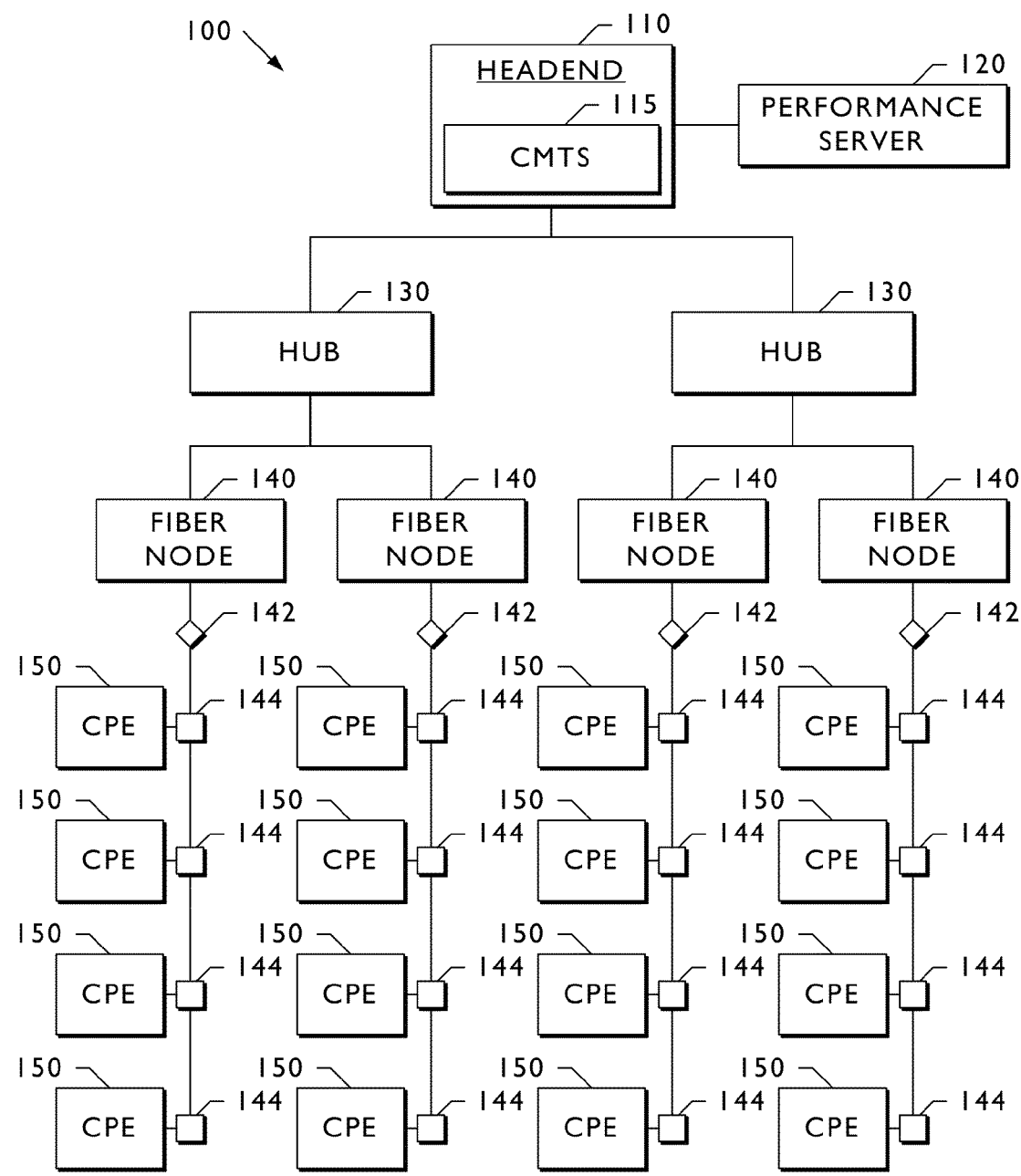
FIG. 1 is a block diagram that illustrates one embodiment of the hardware components of a system for detecting performance degradation in an HFC cable plant.

FIG. 1 is a block diagram that illustrates one embodiment of the hardware components of a system for detecting performance degradation in an HFC cable plant. An HFC cable plant network 100, as shown in FIG. 1, is a data and video content network that connects a cable television headend 110, and a performance server 120, to customer premises equipment (CPE) 150. The headend 110 is a master facility for receiving television signals that are processed and distributed through the HFC cable plant network 100. The signals processed and distributed at the headend 110 include satellite, cable television channels, telephone networks, wireless, and internet protocol (IP) data and video. The headend 110 includes a cable modem termination system (CMTS) 115 to provide high-speed data services, such as cable Internet or voice over Internet Protocol, to cable subscribers. The CMTS 115 includes both Ethernet and RF interfaces. The CMTS 115 routes traffic that is coming from the Internet and telephone networks through the Ethernet interface, and then onto the RF interfaces that are connected to the CPE 150 through the regional or local hubs 130. The performance server 120 is a general-purpose server computer that communicates with the headend 110 to detect performance degradation in the HFC cable plant network 100. Fiber optic cable connects the headend 110 to regional or local hubs 130. The headend 110 distributes the signals that it receives to each hub 130, which may provide additional processing or services before delivering the signals to fiber nodes 140. Fiber optic cable also connects each hub 130 to the fiber nodes 140. The headend 110, hubs 130, and fiber nodes 140 comprise the optical fiber segment of the HFC cable plant network 100.

The fiber nodes 140 are optical receivers that convert the downstream optically modulated signal from each hub 130 to an electrical signal for delivery to the customer premises, and upstream electrical signals from the customer premises to optical signals to the headend 110. Coaxial cable connects each fiber node 140 to the customer premises. The coaxial cable segment of the HFC cable plant network 100 includes trunk and line RF amplifiers 142 at intervals on the coaxial cable to overcome cable attenuation and passive losses of the electrical signal caused by line extenders, splitters, and taps 144 to deliver the signal to the CPE 150 at approximately 25 to 2000 customer locations. The CPE 150 is a device that the HFC cable plant network 100 may interrogate to determine the status of the device, such as a cable modem, set-top box, digital television, or computer. In one embodiment, the CPE 150 is an IP addressable device.

The status of the active and passive devices in the HFC cable plant network 100 is difficult to determine because not all of those devices are IP addressable. Since there are a large number of these active and passive devices in the HFC cable plant network 100, these devices present a large number of opportunities for degradation. When degradation occurs, the cable operator performs maintenance operations to restore adequate performance levels for customer services. To mitigate the performance degradation and improve the quality of service to customers, the performance server 120 detects and isolates the cause of the performance degradation to the smallest HFC cable plant network 100 segment, or elements, that are most likely to be in need of repair.

Figure 2:
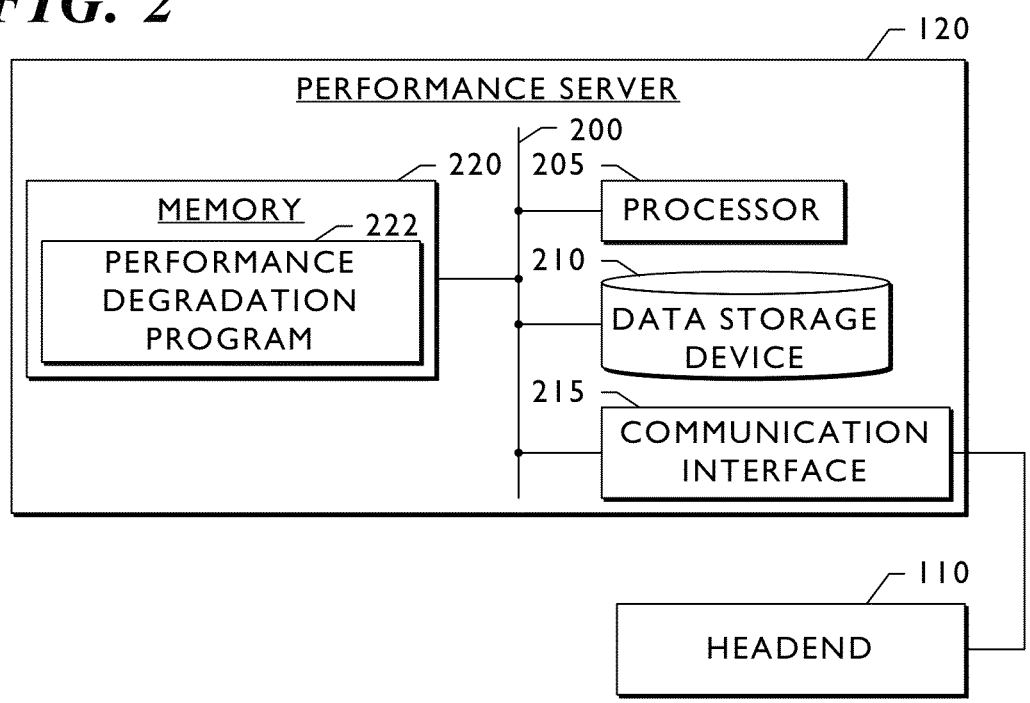
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. Specifically, FIG. 2 illustrates, in detail, one embodiment of the performance server 120.

The performance server 120 shown in FIG. 2 is a general-purpose computer. A bus 200 is a communication medium connecting a processor 205, data storage device 210 (such as a serial ATA (SATA) hard disk drive, optical drive, small computer system interface (SCSI) disk, flash memory, or the like), communication interface 215, and memory 220 (such as random access memory (RAM), dynamic RAM (DRAM), non-volatile computer memory, flash memory, or the like). The communication interface 215 allows for two-way communication of data and content between the performance server 120 and headend 110.

The processor 205 of the performance server 120 performs the disclosed methods by executing sequences of operational instructions that comprise each computer program resident in, or operative on, the memory 220. The reader should understand that the memory 220 may include operating system, administrative, and database programs that support the programs disclosed in this application. In one embodiment, the configuration of the memory 220 of the performance server 120 includes a performance degradation program 222. The performance degradation program 222 performs the method disclosed in the exemplary embodiment depicted in FIG. 3, FIG. 4, FIG. 5, FIG. 6, FIG. 7, FIG. 8, FIG. 9, and FIG. 10. When the processor 205 performs the disclosed method, it stores intermediate results in the memory 220 or data storage device 210. In another embodiment, the processor 205 may swap these programs, or portions thereof, in and out of the memory 220 as needed, and thus may include fewer than all of these programs at any one time.

Figure 3:
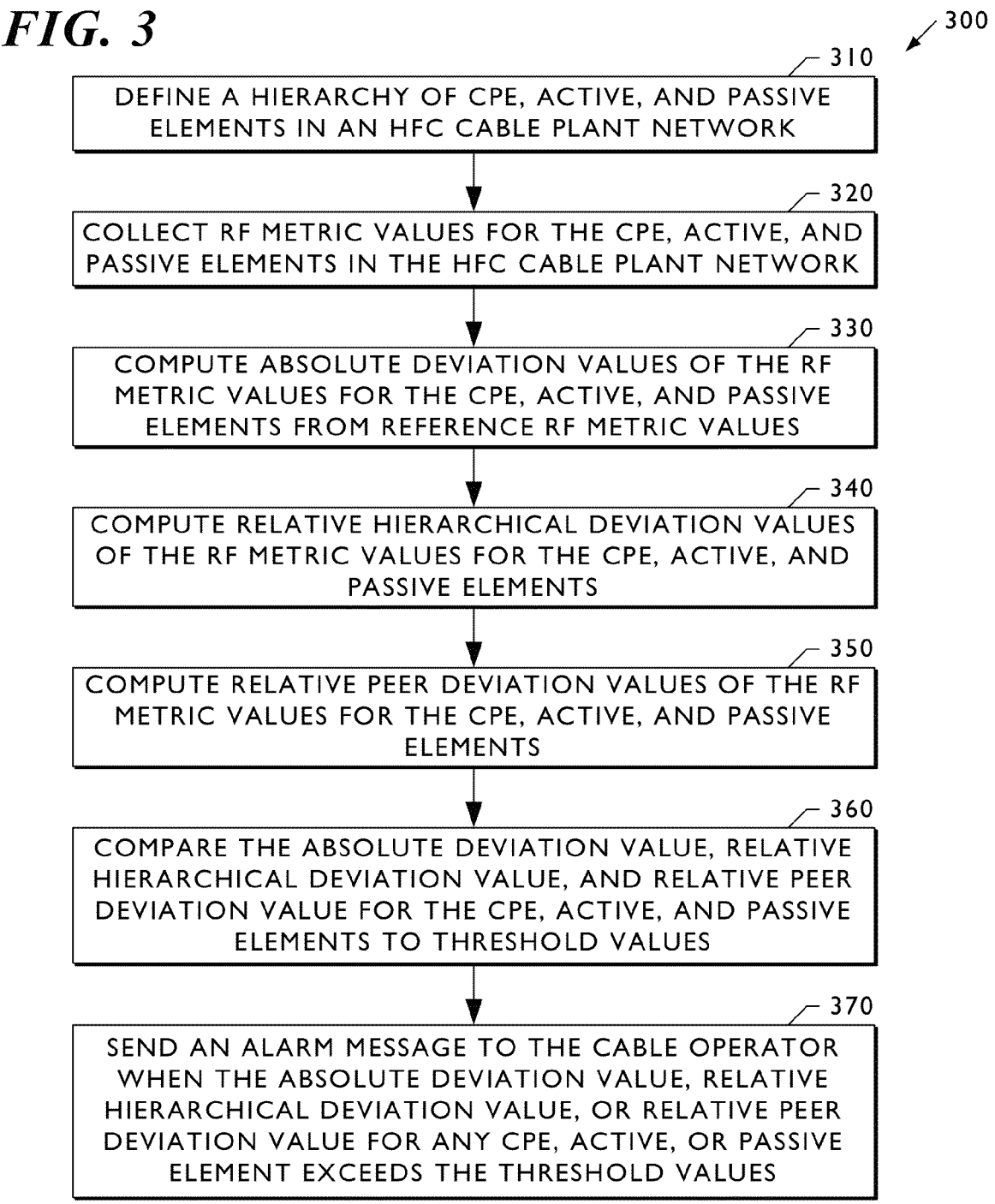
FIG. 3 is a flow diagram that illustrates one embodiment of a method for detecting performance degradation in the HFC cable plant.

FIG. 3 is a flow diagram that illustrates one embodiment of a method for detecting performance degradation in the HFC cable plant. The process 300 starts by defining a hierarchy of CPE 150, active, and passive elements in an HFC cable plant network 100 (step 310). The process 300 then collects RF metric values for the CPE 150, active, and passive elements in the HFC cable plant network 100 (step 320). The RF metric values collected include receive power level, SNR, CER, and the like. The CPE 150 elements include IP addressable cable modems, set-top boxes, digital televisions, computers, and the like. In one embodiment, the RF metric values for each CPE 150 is collected from metrics available from the CPE 150, and from metrics available from the CMTS 115 about the connected CPEs 150. In one embodiment, the RF metric value for each CPE 150 element is an actual RF metric value obtained from the CPE 150 element, and the RF metric value for each active element and each passive element is an estimated RF metric value computed from the RF metric value for at least one CPE 150 element. In one embodiment, the estimated RF metric value for a given active or passive element is an average of the RF metric value for the CPE 150 elements that are children of the given active or passive element. In another embodiment, the process 300 maintains records of the number of samples taken from each CPE 150 that contributed to that average. In yet another embodiment, the process 300 collects RF metric values for the outside plant hierarchy from the fiber node 130 to the CPEs 150.

The process 300 computes absolute deviation values of the RF metric values for the CPE 150, active, and passive elements in the HFC cable plant network 100 from reference RF metric values (step 330). In one embodiment, the process 300 computes the absolute deviation value for each CPE 150, active, and passive element in the HFC cable plant network 100 as the reference RF metric value for the element minus the RF metric value for the element.

The process 300 computes the relative hierarchical deviation values of the RF metric values for the CPE 150, active, and passive elements in the HFC cable plant network 100 (step 340). In one embodiment, the process 300 computes the relative hierarchical deviation value for each CPE 150, active, and passive element in the HFC cable plant network 100 as the RF metric value for the element minus the RF metric value for the parent element in the hierarchy.

The process 300 computes the relative peer deviation values of the RF metric values for the CPE 150, active, and passive elements in the HFC cable plant network 100 (step 350). In one embodiment, the process 300 computes the relative peer deviation value for each CPE 150, active, and passive element in the HFC cable plant network 100 as the RF metric value for the element minus an average of the RF metric value for the peer elements in the hierarchy.

The process 300 compares the absolute deviation values, relative hierarchical deviation values, and relative peer deviation values computed for the CPE 150, active, and passive elements to threshold values (step 360). The process 300 sends an alarm message to a cable operator when the absolute deviation value, relative hierarchical deviation value, or relative peer deviation value for any CPE 150, active, or passive element in the HFC cable plant network 100 exceeds the threshold values (step 370).

The process 300 compares the computed average metrics of each outside plant device to the same metrics of the peers and sibling outside plant devices. The peers or siblings of a device are the devices that share the same parent device within the hierarchy of the outside plant. The process 300 identifies any device that shows significantly worse metrics than its peer devices for any metric as the root cause of degradation in that metric. For the purpose of this comparison, the process 300 computes a weighted average for each metric for the peers of a device, where the average is weighted by the number of CPEs 150 contributing to the average.

In another embodiment, the process 300 performs additional checks to eliminate devices with few devices on them, to avoid spurious variations caused by one or a small number of devices, and range checks on the metrics of the CPE 150 to eliminate erroneous values from misleading the determination of degradation. In another embodiment, the process 300 applies multiple thresholds to identify the severity of degradation.

The peer-comparison process 300 shown in FIG. 3 accurately identifies the device that is likely to be responsible for a degradation compared to other techniques known in the art, such as simple thresholds on the computed average metrics, or comparisons of average metrics of a device to its parent. The peer-comparison process 300 produces fewer alarms, than the simple thresholds technique, by identifying only the top-most device in the hierarchy that shows degradation. The peer-comparison process 300 also identifies more cases of degradation, than the comparison of averages between parent and child devices technique, because the average metric for a parent node reflects the average of both the degraded child node, and the non-degraded peers.

Figure 4:
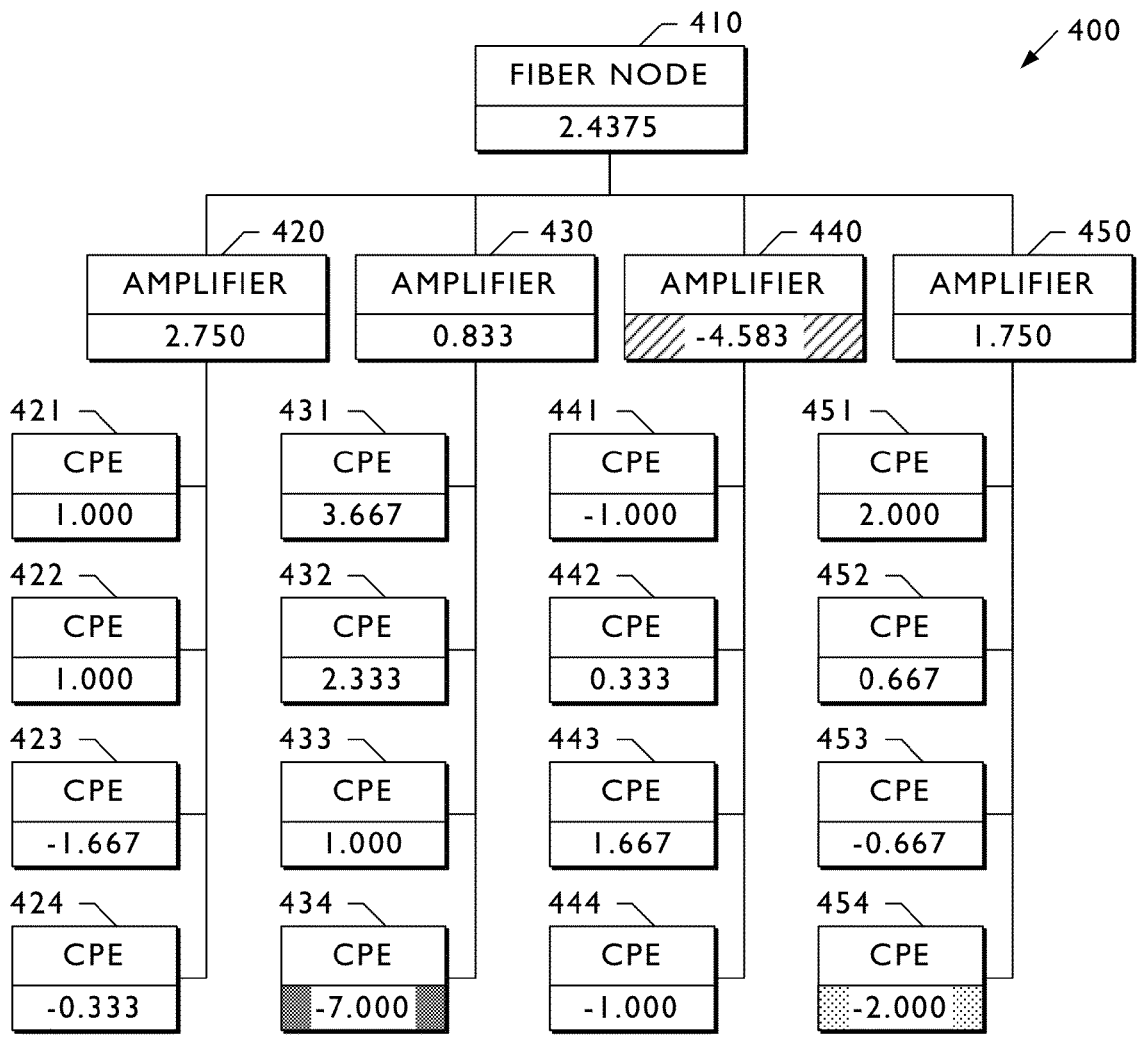
FIG. 4, FIG. 5, FIG. 6, FIG. 7, FIG. 8, FIG. 9, and FIG. 10 are block diagrams that illustrate various exemplary embodiments of a computation of performance degradation in an HFC cable plant.

FIG. 4 is a block diagram that illustrates one exemplary embodiment of a computation of performance degradation in an HFC cable plant. The exemplary HFC cable plant network 400 shown in FIG. 4 is an outside-plant segment that includes three levels of hierarchy. The fiber node 410 is the first level, the amplifiers 420, 430, 440, 450 are the second level of hierarchy, and the CPEs 421, 422, 423, 424, 431, 432, 433, 434, 441, 442, 443, 444, 451, 452, 453, 454 are the third level of hierarchy. Each device in the exemplary HFC cable plant network 400 shown in FIG. 4 includes a computation of degradation using SNR averages. The legend at the bottom of FIG. 4 shows the illustration of the various alarms for the computation of degradation. The legend classifies a 2 dB variation as "Warning" and illustrates that by the shading of the computation of degradation for CPE 454. The legend classifies a 3 dB variation as "Major" and illustrates that by the shading of the computation of degradation for fiber node 440. The legend classifies a 5 dB variation as "Critical" and illustrates that by the shading of the computation of degradation for CPE 434.

Figure 5:
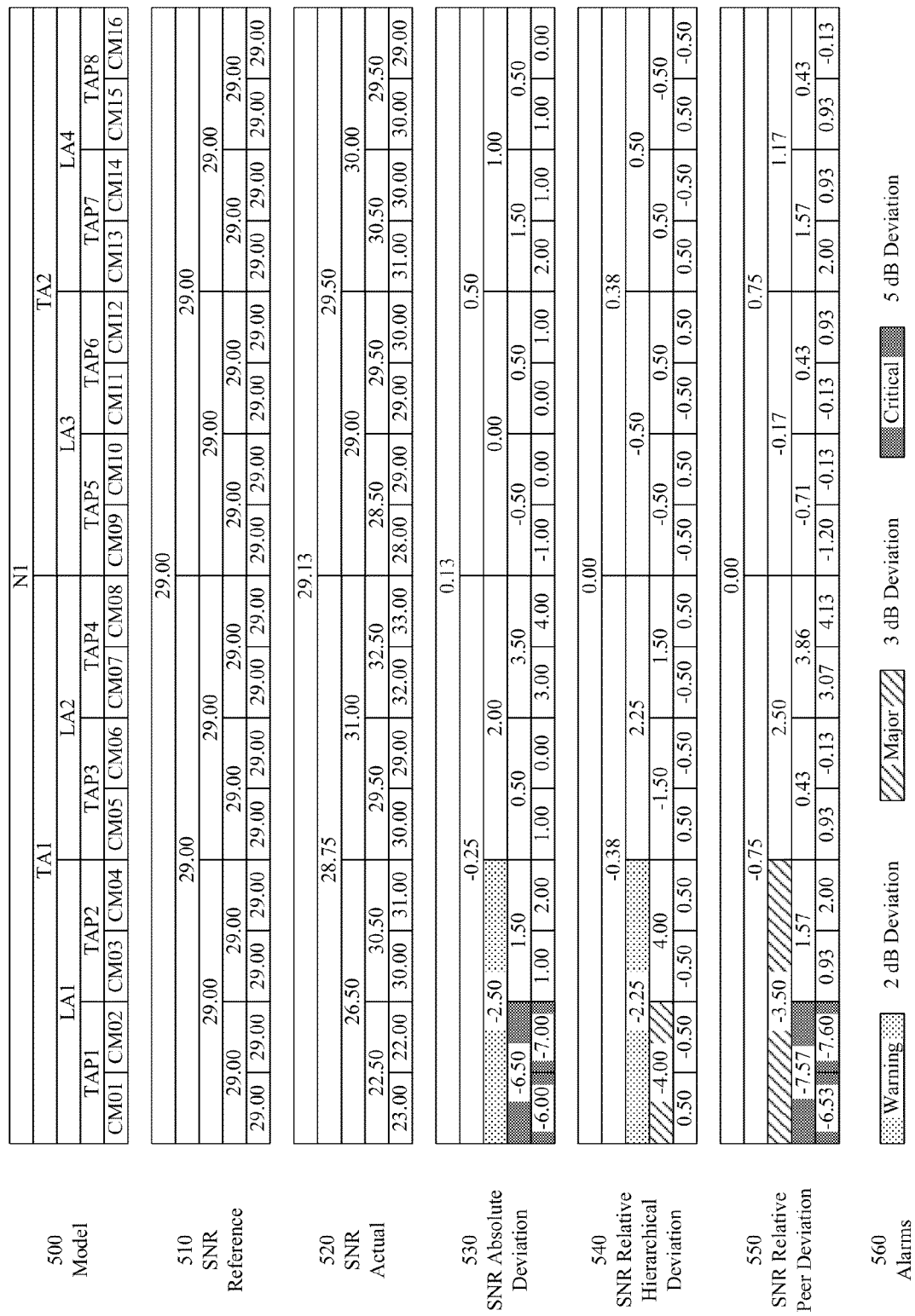

FIG. 5 is a block diagram that illustrates another exemplary embodiment of a computation of performance degradation in an HFC cable plant. The model 500 for the exemplary HFC cable plant shown in FIG. 5 includes five levels of hierarchy for an outside-plant segment. The hierarchy for the model 500 shown in FIG. 5 includes one fiber node (N1), two trunk amplifiers (TA1-TA2), four line amplifiers (LA1-LA4), eight coaxial taps (TAP1-TAP8), and sixteen cable modems (CM01-CM16). The model 500 is a legend for associating an element in the hierarchy with a value shown in one of the other tables in FIG. 5, namely SNR reference 510, SNR actual 520, SNR absolute deviation 530, SNR relative hierarchical deviation 540, and SNR relative peer deviation 550.

The SNR reference 510, shown in FIG. 5, provides a base SNR reading for the elements of the model 500 to use in the computations of performance degradation. The base SNR reading shown in FIG. 5 is the same for all of the elements in the model 500. In another embodiment, the base SNR reading is different for each element in the model 500.

The SNR actual 520, shown in FIG. 5, includes the actual SNR values for the cable modems (CM01-CM16), customer premises equipment at the lowest level of the hierarchy, and SNR values computed from the SNR values for the cable modems for the elements higher in the hierarchy (N1, TA1-TA2, LA1-LA4, and TAP1-TAP8). For example, the SNR value for TAP1 (22.50) is the average of the SNR value for CM01 (23.00) and CM02 (22.00), the SNR value for LA1 (26.50) is the average of the SNR value for TAP1 (22.50) and TAP2 (30.50), etc.

The SNR absolute deviation 530, shown in FIG. 5, is the computed deviation of the SNR actual 520 from the SNR reference 510. For example, the SNR absolute deviation for N1 (0.13) is the SNR actual value for N1 (29.13) minus the SNR reference for N1 (29.00), the SNR absolute deviation for CM01 (−6.00) is the SNR actual value for CM01 (23.00) minus the SNR reference for CM01 (29.00), etc.

The SNR relative hierarchical deviation 540, shown in FIG. 5, is the computed deviation of the SNR actual 520 from the SNR actual for the parent element in the model 500. For example, the SNR relative hierarchical deviation for CM01 (0.50) is the SNR actual value for CM01 (23.00) minus the SNR actual value for TAP1 (22.50), the SNR relative hierarchical deviation for TAP2 (4.00) is the SNR actual value for TAP2 (30.50) minus the SNR actual value for LA1 (26.50), etc. Since the fiber node N1 has no parent element in the model 500, the SNR relative hierarchical deviation for N1 is 0.00.

The SNR relative peer deviation 550, shown in FIG. 5, is the computed deviation of the SNR actual 520 from the average of the SNR actual for the peer elements in the model 500. For example, the SNR relative peer deviation for LA1 (−3.50) is the SNR actual value for LA1 (26.50) minus the average of the SNR actual value for the peer elements of LA1 (LA2 (31.00) plus LA3 (29.00) plus LA4 (30.00) divided by 3), the SNR relative peer deviation for CM01 (−6.53) is the SNR actual value for CM01 (23.00) minus the average of the SNR actual value for the peer elements of CM01 (CM02 (22.00) plus CM03 (30.00) plus CM04 (31.00) plus CM05 (30.00) plus CM06 (29.00) plus CM07 (32.00) plus CM08 (33.00) plus CM09 (28.00) plus CM10 (29.00) plus CM11 (29.00) plus CM12 (30.00) plus CM13 (31.00) plus CM14 (30.00) plus CM15 (30.00) plus CM16 (29.00) divided by 15), etc. Since the fiber node N1 has no peer element in the model 500, the SNR relative peer deviation for N1 is 0.00.

The alarms 560, shown in FIG. 5, are the threshold values to determine whether the deviation of an element in the model 500 is classified as a Warning (between −2 dB and −3 dB deviation), Major (between −3 dB and −5 dB deviation), or Critical (exceeding −5 dB deviation). As shown in FIG. 5, the SNR absolute deviation 530 for LA1 (−2.50) and the SNR relative hierarchical deviation 540 for LA1 (−2.25) are classified as a Warning, but the SNR relative peer deviation 550 for LA1 (−3.50) is classified as Major. LA1 is not likely the cause of the performance degradation, because the SNR absolute deviation 530 for TAP1 (−6.50), CM01 (−6.00), and CM02 (−7.00), and the SNR relative peer deviation 550 for TAP1 (−7.57), CM01 (−6.53), and CM02 (−7.60), are all classified as Critical. Thus, in the example shown in FIG. 5, TAP1 is the most likely cause of the performance degradation.

Figure 6:
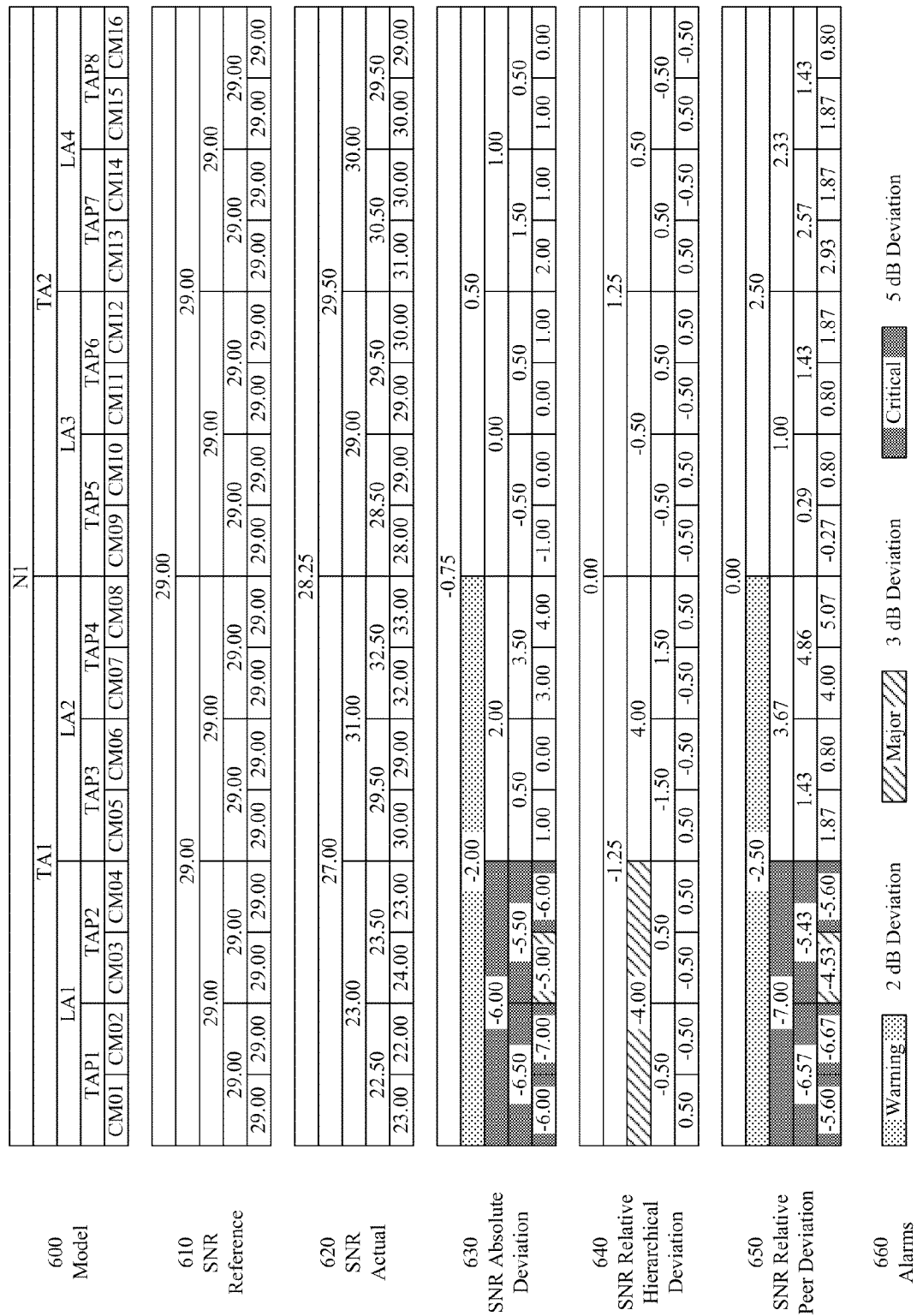

FIG. 6 is a block diagram that illustrates another exemplary embodiment of a computation of performance degradation in an HFC cable plant. The model 600 for the exemplary HFC cable plant shown in FIG. 6 is the same as the model 500 shown in FIG. 5. The SNR actual 620, shown in FIG. 6, includes different actual SNR values than those shown in FIG. 5, but the computations to produce the SNR absolute deviation 630, SNR relative hierarchical deviation 640, and SNR relative peer deviation 650 are the same as those shown in FIG. 5.

The alarms 660, shown in FIG. 6, are the same as those shown in FIG. 5. As shown in FIG. 6, the SNR absolute deviation 630 for TA1 (−2.00) and the SNR relative peer deviation 650 for TA1 (−2.50) are classified as a Warning, but the SNR relative hierarchical deviation 640 for TA1 (−4.00) is classified as Major. TA1 is not likely the cause of the performance degradation, because the SNR absolute deviation 630 for LA1 (−6.00), TAP1 (−6.50), TAP2 (−5.50), CM01 (−6.00), CM02 (−7.00), and CM04 (−6.00), and the SNR relative peer deviation 650 for LA1 (−7.00), TAP1 (−6.57), TAP2 (−5.43), CM01 (−5.60), CM02 (−6.67), and CM04 (−5.60), are all classified as Critical. Thus, in the example shown in FIG. 6, LA1 is the most likely cause of the performance degradation.

Figure 7:
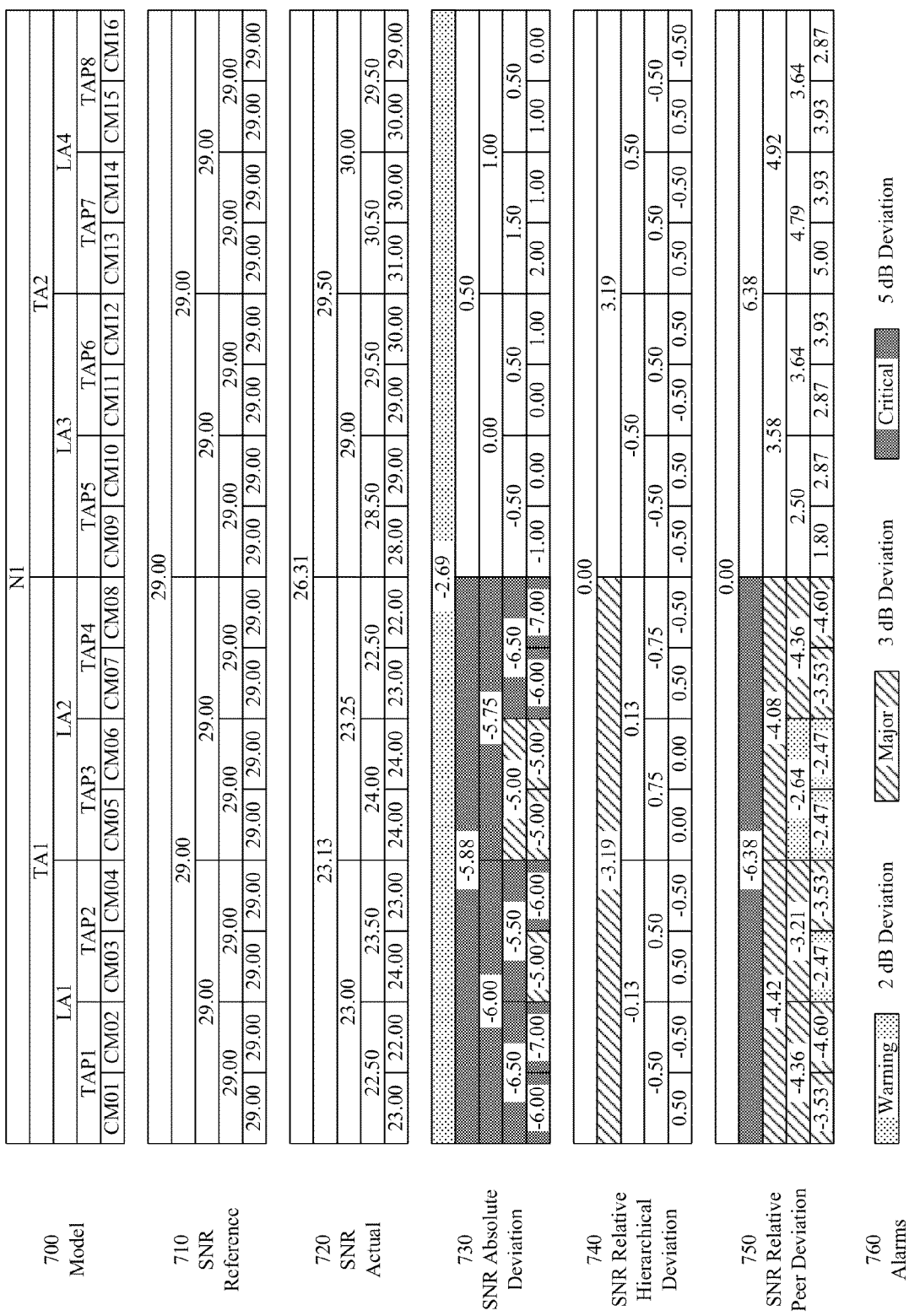

FIG. 7 is a block diagram that illustrates another exemplary embodiment of a computation of performance degradation in an HFC cable plant. The model 700 for the exemplary HFC cable plant shown in FIG. 7 is the same as the model 500 shown in FIG. 5. The SNR actual 720, shown in FIG. 7, includes different actual SNR values than those shown in FIG. 5, but the computations to produce the SNR absolute deviation 730, SNR relative hierarchical deviation 740, and SNR relative peer deviation 750 are the same as those shown in FIG. 5.

The alarms 760, shown in FIG. 7, are the same as those shown in FIG. 5. As shown in FIG. 7, the SNR absolute deviation 730 for N1 (−2.69) and the SNR relative peer deviation 750 for TAP3 (−2.64), CM03 (−2.47), CM05 (−2.47), and CM06 (−2.47) are classified as a Warning, but the SNR absolute deviation 730 for TAP3 (−5.00), CM03 (−5.00), CM05 (−5.00), and CM06 (−5.00) are classified classified as Major. N1 is not likely the cause of the performance degradation, because the SNR absolute deviation 730 for TA1 (−5.88), LA1 (−6.00), LA2 (−5.75), TAP1 (−6.50), TAP2 (−5.50), TAP4 (−6.50), CM01 (−6.00), CM02 (−7.00), CM04 (−6.00), CM07 (−6.00), and CM08 (−7.00), and the SNR relative peer deviation 750 for TA1 (−6.38) are all classified as Critical. Thus, in the example shown in FIG. 7, TA1 is the most likely cause of the performance degradation.

Figure 8:
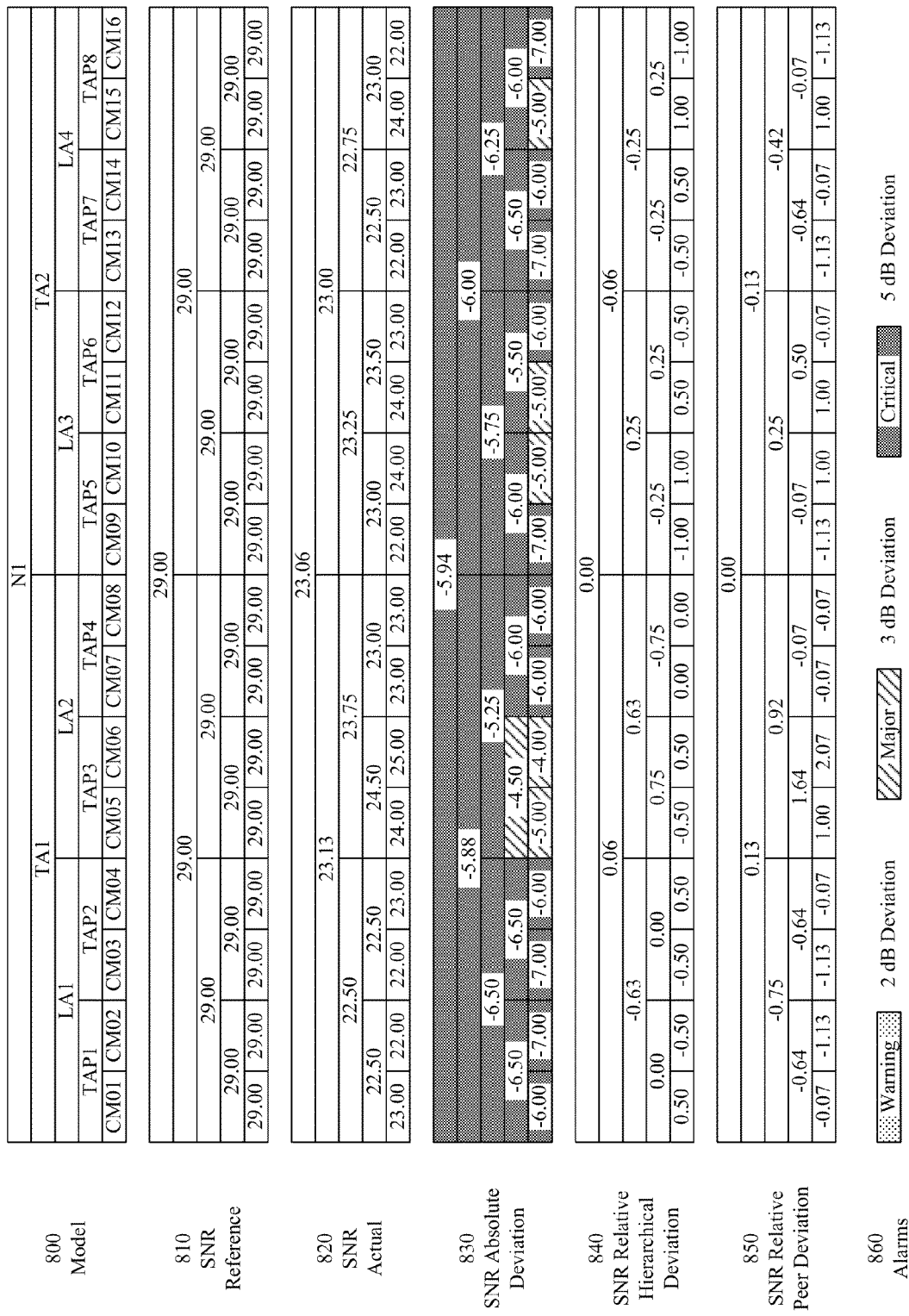

FIG. 8 is a block diagram that illustrates another exemplary embodiment of a computation of performance degradation in an HFC cable plant. The model 800 for the exemplary HFC cable plant shown in FIG. 8 is the same as the model 500 shown in FIG. 5. The SNR actual 820, shown in FIG. 8, includes different actual SNR values than those shown in FIG. 5, but the computations to produce the SNR absolute deviation 830, SNR relative hierarchical deviation 840, and SNR relative peer deviation 850 are the same as those shown in FIG. 5.

The alarms 860, shown in FIG. 8, are the same as those shown in FIG. 5. As shown in FIG. 8, the SNR absolute deviation 830 for TAP3 (−4.50), CM05 (−5.00), CM06 (−4.00), CM10 (−5.00), CM11 (−5.00), and CM15 (−5.00) are classified as a Major. TAP3 is not likely the cause of the performance degradation, because the SNR absolute deviation 830 for N1 (−5.94), TA1 (−5.88), TA2 (−6.00), LAI (−6.50), LA2 (−5.25), LA3 (−5.75), LA4 (−6.25), TAP1 (−6.50), TAP2 (−6.50), TAP4 (−6.00), TAPS (−6.00), TAPE (−5.50), TAP7 (−6.50), TAP8 (−6.00), CM01 (−6.00), CM02

(−7.00), CM03 (−7.00), CM04 (−6.00), CM07 (−6.00), CM08 (−6.00), CM09 (−7.00), CM12 (−6.00), CM13 (−7.00), CM14 (−6.00), and CM16 (−7.00) are classified as Critical. Thus, in the example shown in FIG. 8, N1 is the most likely cause of the performance degradation.

Figure 9:
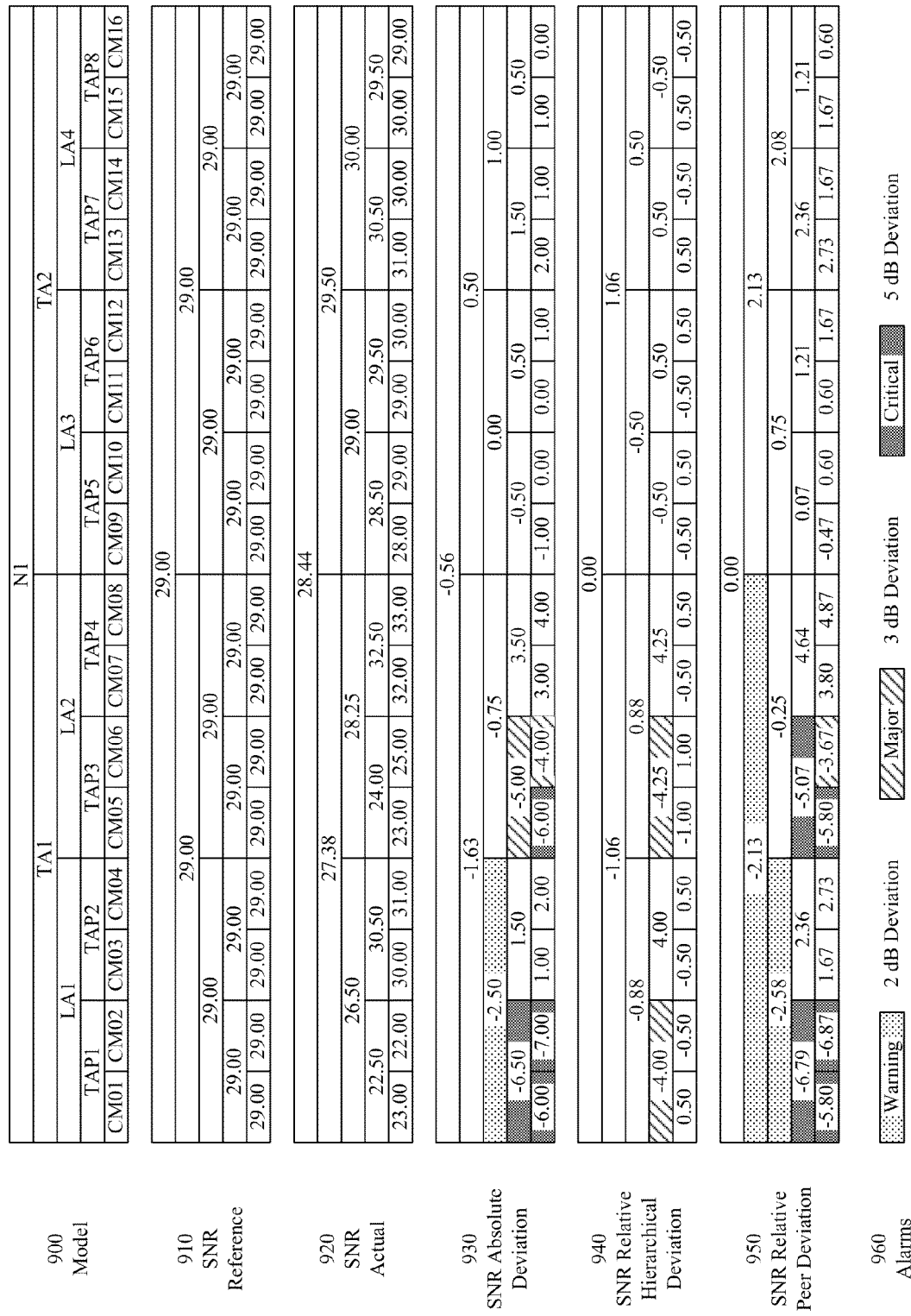

FIG. 9 is a block diagram that illustrates another exemplary embodiment of a computation of performance degradation in an HFC cable plant. The model 900 for the exemplary HFC cable plant shown in FIG. 9 is the same as the model 500 shown in FIG. 5. The SNR actual 920, shown in FIG. 9, includes different actual SNR values than those shown in FIG. 5, but the computations to produce the SNR absolute deviation 930, SNR relative hierarchical deviation 940, and SNR relative peer deviation 950 are the same as those shown in FIG. 5.

The alarms 960, shown in FIG. 9, are the same as those shown in FIG. 5. As shown in FIG. 9, the SNR absolute deviation 930 for LA1 (−2.50) and the SNR relative peer deviation 950 for TA1 (−2.13) and LA1 (−2.58) are classified as a Warning, but the SNR absolute deviation 930 for TAP3 (−5.00) and CM06 (−4.00), the SNR relative hierarchical deviation 940 for TAP1 (−4.00) and TAP3 (−4.25), and the SNR relative peer deviation 950 for CM06 (−3.67) are classified as Major. LA1 is not likely the cause of the performance degradation, because the SNR absolute deviation 930 for TAP1 (−6.50), CM01 (−6.00), CM02 (−7.00), and CM04 (−6.00), and the SNR relative peer deviation 950 for TAP1 (−6.79), TAP3 (−5.07), CM01 (−5.80), CM02 (−6.87), and CM05 (−5.80), are all classified as Critical. Thus, in the example shown in FIG. 9, TAP1 and TAP3 are the most likely cause of the performance degradation.

Figure 10:
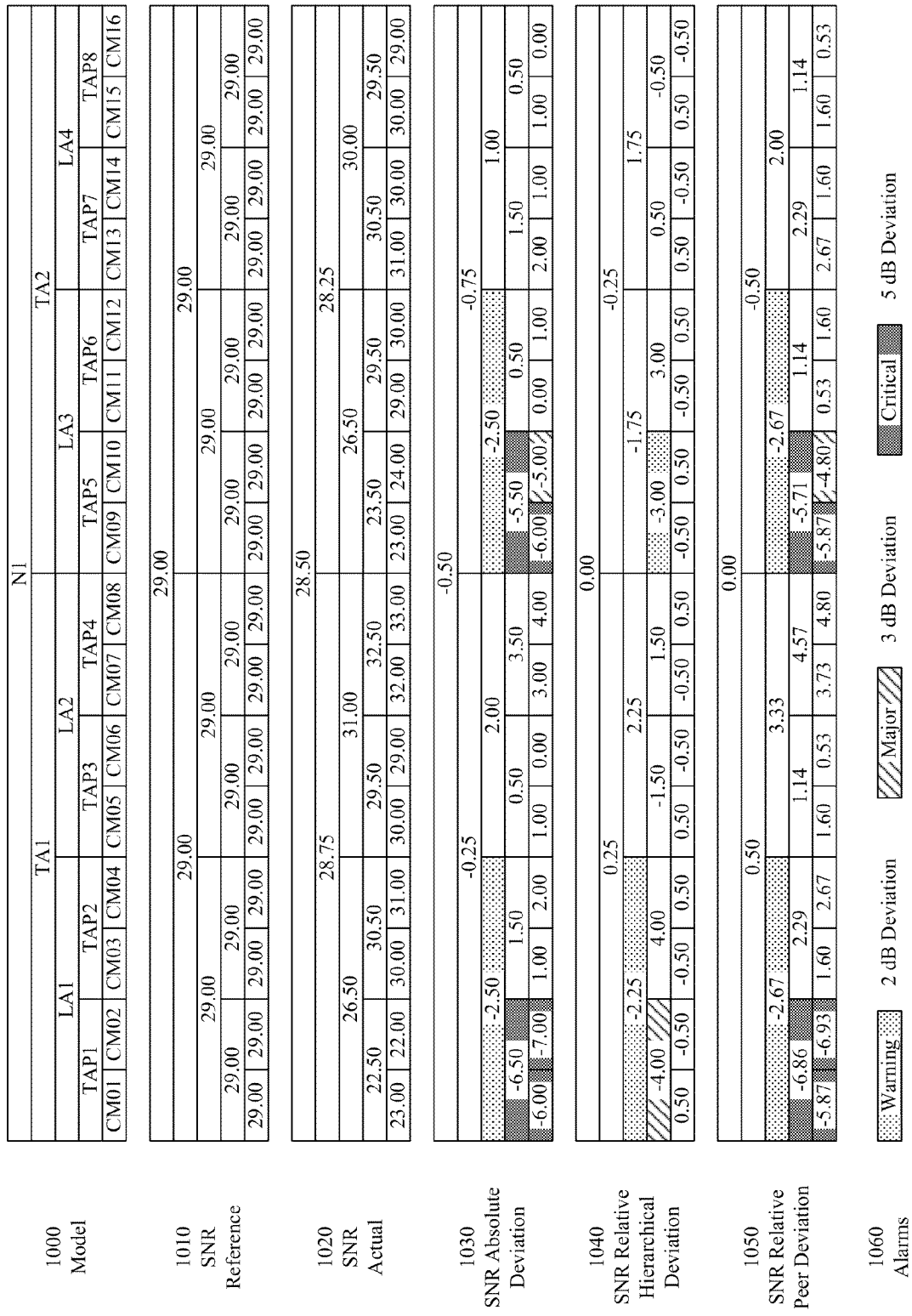

FIG. 10 is a block diagram that illustrates another exemplary embodiment of a computation of performance degradation in an HFC cable plant. The model 1000 for the exemplary HFC cable plant shown in FIG. 10 is the same as the model 500 shown in FIG. 5. The SNR actual 1020, shown in FIG. 10, includes different actual SNR values than those shown in FIG. 5, but the computations to produce the SNR absolute deviation 1030, SNR relative hierarchical deviation 1040, and SNR relative peer deviation 1050 are the same as those shown in FIG. 5.

The alarms 1060, shown in FIG. 10, are the same as those shown in FIG. 5. As shown in FIG. 10, the SNR absolute deviation 1030 for LA1 (−2.50) and LA3 (−2.50), the SNR relative hierarchical deviation 1040 for LA1 (−2.25) and TAPS (−3.00), and the SNR relative peer deviation 1050 for LA1 (−2.67) and LA3 (−2.67) are classified as a Warning, but the SNR absolute deviation 1030 for CM10 (−5.00), the SNR relative hierarchical deviation 1040 for TAP1 (−4.00), and the SNR relative peer deviation 1050 for CM10 (−4.80) are classified as Major. LA1 and LA3 are not likely the cause of the performance degradation, because the SNR absolute deviation 1030 for TAP1 (−6.50), TAPS (−5.50), CM01 (−6.00), CM02 (−7.00), and CM09 (−6.00), and the SNR relative peer deviation 1050 for TAP1 (−6.86), TAPS (−5.71), CM01 (−5.87), CM02 (−6.93), and CM09 (−5.87), are all classified as Critical. Thus, in the example shown in FIG. 10, TAP1 and TAPS are the most likely cause of the performance degradation.

Although the disclosed embodiments describe a fully functioning method implemented in a computer system for detecting performance degradation in the HFC cable plant, the reader should understand that other equivalent embodiments exist. Since numerous modifications and variations will occur to those reviewing this disclosure, the method implemented in a computer system for detecting performance degradation in the HFC cable plant is not limited to the exact construction and operation illustrated and disclosed. Accordingly, this disclosure intends all suitable modifications and equivalents to fall within the scope of the claims.

We claim:

1. A computing device for detecting performance degradation in a hybrid fiber-coaxial (HFC) cable plant having customer premises equipment (CPE) elements, active elements, and passive elements, comprising:
a memory device resident in the computing device; and
a processor disposed in communication with the memory device, the processor configured to:
collect radio frequency (RF) metric values for the CPE elements, the active elements, and the passive elements;
compute absolute deviation values of the RF metric values for the CPE elements, the active elements, and the passive elements, wherein each absolute deviation value is from a reference value associated with the element;
compute relative hierarchical deviation values of the RF metric values for the CPE elements, the active elements, and the passive elements;
compute relative peer deviation values of the RF metric values for the CPE elements, the active elements, and the passive elements;
compare the absolute deviation value, relative hierarchical deviation value, and relative peer deviation value for each CPE element, each active element, and each passive element to at least one threshold value; and
send an alarm message to an operator when the absolute deviation value, relative hierarchical deviation value, or relative peer deviation value for any CPE element, any active element, or any passive element exceeds said at least one threshold value.

2. The computing device of claim 1, wherein the RF metric value is at least one of a receive power level, a signal-to-noise ratio (SNR), and a codeword error rate (CER).

3. The computing device of claim 1, wherein the CPE elements are at least one of IP addressable cable modems, IP addressable set-top boxes, digital televisions, and computers.

4. The computing device of claim 1, wherein the RF metric value for each CPE element is an actual RF metric value obtained from the CPE element, and wherein the RF metric value for each active element and each passive element is an estimated RF metric value computed from the RF metric value for at least one CPE element.

5. The computing device of claim 4, wherein the estimated RF metric value for a given active element or passive element is an average of the RF metric value for the CPE elements that are child CPE elements of the given active element or passive element.

6. The computing device of claim 1, wherein the absolute deviation value for a given CPE element, active element, or passive element is the reference RF metric value for the given CPE element, active element, or passive element minus the RF metric value for the given CPE element, active element, or passive element.

7. The computing device of claim 1, wherein the relative hierarchical deviation value for a given CPE element, active element, or passive element is the RF metric value for the given CPE element, active element, or passive element minus the RF metric value for a parent element of the given CPE element, active element, or passive element.

8. The computing device of claim 1, wherein the relative peer deviation value for a given CPE element, active element, or passive element is the RF metric value for the given CPE element, active element, or passive element minus an average of the RF metric value for at least one peer element of the given CPE element, active element, or passive element.

9. The computing device of claim 1, wherein each threshold value is prioritized by severity, and wherein the sending of the alarm message to the operator occurs when exceeding the threshold value associated with the most severity.

10. A method implemented in a computer system for detecting performance degradation in a hybrid fiber-coaxial (HFC) cable plant having customer premises equipment (CPE) elements, active elements, and passive elements, comprising:
    collecting radio frequency (RF) metric values for the CPE elements, the active elements, and the passive elements;
    computing absolute deviation values of the RF metric values for the CPE elements, the active elements, and the passive elements, wherein each absolute deviation value is from a reference value associated with the element;
    computing relative hierarchical deviation values of the RF metric values for the CPE elements, the active elements, and the passive elements;
    computing relative peer deviation values of the RF metric values for the CPE elements, the active elements, and the passive elements;
    comparing the absolute deviation value, relative hierarchical deviation value, and relative peer deviation value for each CPE element, each active element, and each passive element to at least one threshold value; and
    sending an alarm message to an operator when the absolute deviation value, relative hierarchical deviation value, or relative peer deviation value for any CPE element, any active element, or any passive element exceeds said at least one threshold value.

11. The method of claim 10, wherein the RF metric value is at least one of a receive power level, a signal-to-noise ratio (SNR), and a codeword error rate (CER).

12. The method of claim 10, wherein the CPE elements are at least one of IP addressable cable modems, IP addressable set-top boxes, digital televisions, and computers.

13. The method of claim 10, wherein the RF metric value for each CPE element is an actual RF metric value obtained from the CPE element, and wherein the RF metric value for each active element and each passive element is an estimated RF metric value computed from the RF metric value for at least one CPE element.

14. The method of claim 13, wherein the estimated RF metric value for a given active element or passive element is an average of the RF metric value for the CPE elements that are child CPE elements of the given active element or passive element.

15. The method of claim 10, wherein the absolute deviation value for a given CPE element, active element, or passive element is the reference RF metric value for the given CPE element, active element, or passive element minus the RF metric value for the given CPE element, active element, or passive element.

16. The method of claim 10, wherein the relative hierarchical deviation value for a given CPE element, active element, or passive element is the RF metric value for the given CPE element, active element, or passive element minus the RF metric value for a parent element of the given CPE element, active element, or passive element.

17. The method of claim 10, wherein the relative peer deviation value for a given CPE element, active element, or passive element is the RF metric value for the given CPE element, active element, or passive element minus an average of the RF metric value for at least one peer element of the given CPE element, active element, or passive element.

18. The method of claim 10, wherein each threshold value is prioritized by severity, and wherein the sending of the alarm message to the operator occurs when exceeding the threshold value associated with the most severity.

19. A non-transitory computer-readable medium, comprising computer-executable instructions that, when executed on a computing device for detecting performance degradation in a hybrid fiber-coaxial (HFC) cable plant having customer premises equipment (CPE) elements, active elements, and passive elements, perform steps of:
    collecting radio frequency (RF) metric values for the CPE elements, the active elements, and the passive elements;
    computing absolute deviation values of the RF metric values for the CPE elements, the active elements, and the passive elements, wherein each absolute deviation value is from a reference value associated with the element;
    computing relative hierarchical deviation values of the RF metric values for the CPE elements, the active elements, and the passive elements;
    computing relative peer deviation values of the RF metric values for the CPE elements, the active elements, and the passive elements;
    comparing the absolute deviation value, relative hierarchical deviation value, and relative peer deviation value for each CPE element, each active element, and each passive element to at least one threshold value; and
    sending an alarm message to an operator when the absolute deviation value, relative hierarchical deviation value, or relative peer deviation value for any CPE element, any active element, or any passive element exceeds said at least one threshold value.

* * * * *